US012513559B2

(12) United States Patent
Lu et al.

(10) Patent No.: US 12,513,559 B2
(45) Date of Patent: Dec. 30, 2025

(54) METHOD FOR RESOLVING TRANSMISSION CONFLICT, APPARATUS, TERMINAL, AND MEDIUM

(71) Applicant: GUANGDONG OPPO MOBILE TELECOMMUNICATIONS CORP., LTD., Guangdong (CN)

(72) Inventors: Qianxi Lu, Guangdong (CN); Zhenshan Zhao, Guangdong (CN); Huei-Ming Lin, Victoria (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 310 days.

(21) Appl. No.: 17/565,501

(22) Filed: Dec. 30, 2021

(65) Prior Publication Data

US 2022/0124551 A1    Apr. 21, 2022

Related U.S. Application Data

(63) Continuation of application No. PCT/CN2019/107605, filed on Sep. 24, 2019.

(51) Int. Cl.
*H04W 28/02* (2009.01)
*H04W 72/566* (2023.01)
*H04W 4/40* (2018.01)

(52) U.S. Cl.
CPC ... *H04W 28/0268* (2013.01); *H04W 28/0278* (2013.01); *H04W 72/569* (2023.01); *H04W 4/40* (2018.02)

(58) Field of Classification Search
None
See application file for complete search history.

(56) References Cited

U.S. PATENT DOCUMENTS

2015/0043446 A1   2/2015  Tsrtss et al.
2015/0173048 A1   6/2015  Seo et al.
(Continued)

FOREIGN PATENT DOCUMENTS

CN    107396394    11/2017
CN    109891987     6/2019
(Continued)

OTHER PUBLICATIONS

Office Action of Europe Counterpart Application No. 19947332.3, issued on Sep. 27, 2022, pp. 1-5.
(Continued)

*Primary Examiner* — Kouroush Mohebbi
(74) *Attorney, Agent, or Firm* — Hodgson Russ LLP

(57) ABSTRACT

The disclosure discloses a method for resolving a transmission conflict and relates to the field of wireless communication. The method comprises: when two transmissions experience a conflict, prioritizing the transmission of one transmission among the two transmissions according to quality of service (QoS) attributes respectively associated with the two transmissions. When two transmissions experience a conflict, the QoS attributes of the two transmissions are considered, and the priority of transmission is determined according to the QoS attributes respectively associated with the two transmissions to thereby determine an object that is prioritized for transmission, which may effectively allocate network bandwidth and use network resources more reasonably.

12 Claims, 3 Drawing Sheets

(56) References Cited

U.S. PATENT DOCUMENTS

| | | | |
|---|---|---|---|
| 2018/0160445 A1 | 6/2018 | Babaei et al. | |
| 2018/0234995 A1 | 8/2018 | Jung et al. | |
| 2021/0029723 A1* | 1/2021 | Wu | H04W 72/569 |

FOREIGN PATENT DOCUMENTS

| | | |
|---|---|---|
| CN | 110139383 | 8/2019 |
| EP | 3536098 | 9/2019 |
| JP | 2018186506 | 11/2018 |
| WO | 2018082571 | 5/2018 |
| WO | 2020030118 | 2/2020 |

OTHER PUBLICATIONS

"Search Report of Europe Counterpart Application No. 19947332.3", issued on May 10, 2022, p. 1-p. 8.

Office Action of Japan Counterpart Application No. 2022-509734, with English translation thereof, issued on Aug. 15, 2023, pp. 1-9.

"International Search Report (Form PCT/ISA/210) of PCT/CN2019/107605", mailed on Jun. 23, 2020, with English translation thereof, pp. 1-4.

"Written Opinion of the International Searching Authority (Form PCT/ISA/237) of PCT/ CN2019/107605," mailed on Jun. 23, 2020, with English translation thereof, pp. 1-6.

Huawei et al., "QoS management for NR sidelink", 3GPP TSG RAN WG1 Meeting #96bis R1-1903952, Apr. 2019, pp. 1-4.

Vodafone, "New SID: Study on NR V2X", 3GPP TSG RAN Meeting #80 RP-181429, Jun. 2018, pp. 1-5.

Office Action of China Counterpart Application No. 202210198000.1, with English translation thereof, issued on May 26, 2023, pp. 1-19.

"Notice of Allowance of China Counterpart Application No. 202210198000.1", with English translation thereof, issued on Jul. 28, 2023, pp. 1-5.

"Office Action of Europe Counterpart Application, Application No. 19947332.3", issued on Feb. 24, 2023, p. 1-p. 6.

Office Action of China Counterpart Application, Application No. 202210198000.1, with English translation thereof, Issued on Feb. 24, 2023, pp. 1-15.

Office Action of Japan Counterpart Application No. 2022-509734, with English translation thereof, issued on Feb. 6, 2024, pp. 1-5.

"Notice of Allowance of Japan Counterpart Application, Application No. 2022-509734", with English translation thereof, issued on Sep. 17, 2024, p. 1-p. 4.

Qualcomm Incorporated, "Uplink and Sidelink Prioritization in NR V2X", 3GPP TSG RAN WG2 #107 R2-1910872, Aug. 26-30, 2019, pp. 1-5.

KIPO, Office Action for KR Application No. 10-2022-7005270, Mar. 13, 2025.

IPI, Office Action for IN Application No. 202127062071, May 4, 2022.

JPO, Office Action for JP Application No. 2024-091719, Jun. 17, 2025.

* cited by examiner

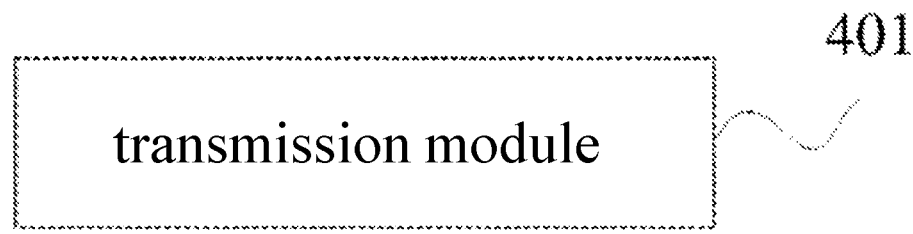
FIG. 3
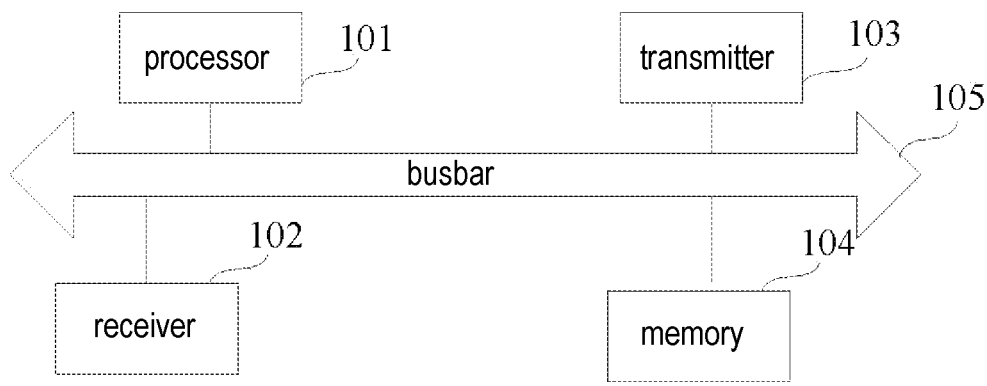
FIG. 4
FIG. 5

METHOD FOR RESOLVING TRANSMISSION CONFLICT, APPARATUS, TERMINAL, AND MEDIUM

CROSS-REFERENCE TO RELATED APPLICATION

This application is a continuation of international PCT application serial no. PCT/CN2019/107605, filed on Sep. 24, 2019. The entirety of the above-mentioned patent application is hereby incorporated by reference herein and made a part of this specification.

BACKGROUND

Field of the Disclosure

This disclosure relates to the field of wireless communication, and in particular to a method for resolving a transmission conflict, an apparatus, a terminal and a medium.

Description of Related Art

With the development of mobile communication technology, the 5th generation mobile networks (5G) era along with Internet of Everything is coming. In order to achieve the direct communication between the user equipment (UE) and the UE in vehicle to everything (V2X), SideLink (SL) transmission method is introduced. Therefore, for UE in the V2X scenario, there may be conflicts between uplink transmission and SL transmission.

The uplink/SL transmission conflict resolution method in the related technology is based on the quality of service (QoS) attribute of SL. When the priority of the SL data is lower than a threshold, that is, when the priority of the SL is higher, the SL transmission on the SL is performed with high priority; otherwise, the uplink transmission on the uplink is performed with high priority.

In the above uplink/SL transmission conflict resolution method, only the QoS attributes of SL are considered, and the uplink transmissions with different QoS attributes cannot be distinguished, which causes unreasonable utilization of transmission resources.

SUMMARY OF THE DISCLOSURE

The embodiment of the disclosure provides a transmission conflict resolution method, an apparatus, a terminal and a medium, which can be used to resolve the problem of unreasonable utilization of transmission resources occurred when only the QoS attributes of SL are considered, and the uplink transmissions with different QoS attributes cannot be distinguished in solving uplink/SL transmission conflict.

According to an aspect of the disclosure, there is provided a method for resolving a transmission conflict, the method includes the following.

When two transmissions experience a conflict, the transmission of one transmission among the two transmissions is prioritized according to QoS attributes respectively associated with the two transmissions.

In an alternative embodiment, the two transmissions include: a first uplink transmission and a first SL transmission.

The operation of prioritizing the transmission of one transmission among the two transmissions according to QoS attributes respectively associated with the two transmissions includes the following.

If the first priority associated with the first uplink transmission is higher than the second priority associated with the first SL transmission, the transmission of the first uplink transmission is prioritized.

Or, if the first priority associated with the first uplink transmission is not higher than the second priority associated with the first SL transmission, the transmission of the first SL transmission is prioritized.

Or, if the first priority associated with the first uplink transmission is higher than a first threshold, the transmission of the first uplink transmission is prioritized.

Or, if the first priority associated with the first uplink transmission is not higher than the first threshold, the transmission of the first SL transmission is prioritized.

Or, if the first priority associated with the first uplink transmission is not higher than the first threshold, and the second priority associated with the first SL transmission is higher than the second threshold, the transmission of the first SL transmission is prioritized.

Or, if the first priority associated with the first uplink transmission is not higher than the first threshold, and the second priority associated with the first SL transmission is not higher than the second threshold, the transmission of the first uplink transmission is prioritized.

In an alternative embodiment, the two transmissions include: a first uplink transmission and a second uplink transmission; the first uplink transmission includes an uplink data-related part, and the second uplink transmission includes a SL data-related part.

The operation of prioritizing the transmission of one transmission among the two transmissions according to QoS attributes respectively associated with the two transmissions includes the following.

If the first priority associated with the first uplink transmission is higher than the third priority associated with the second uplink transmission, the transmission of the first uplink transmission is prioritized.

Or, if the first priority associated with the first uplink transmission is not higher than the third priority associated with the second uplink transmission, the transmission of the second uplink transmission is prioritized.

Or, if the third priority associated with the second uplink transmission is higher than the third threshold, the transmission of the second uplink transmission is prioritized.

Or, if the third priority associated with the second uplink transmission is not higher than the third threshold, the transmission of the first uplink transmission is prioritized.

Or, if the first priority associated with the first uplink transmission is higher than the fourth threshold, the transmission of the first uplink transmission is prioritized.

Or, if the first priority associated with the first uplink transmission is not higher than the fourth threshold, the transmission of the second uplink transmission is prioritized.

Or, if the first priority associated with the first uplink transmission is not higher than the fourth threshold, and the third priority associated with the second uplink transmission is higher than the fifth threshold, the transmission of the second uplink transmission is prioritized.

Or, if the first priority associated with the first uplink transmission is not higher than the fourth threshold, and the third priority associated with the second uplink transmission is not higher than the fifth threshold, the transmission of the first uplink transmission is prioritized.

In an alternative embodiment, the first priority associated with the first uplink transmission includes any one of the following priorities.

The priority associated with the logical channel associated with the data included in the first uplink transmission.

The priority associated with the data included in the first uplink transmission.

The priority associated with the logical channel associated with the data that triggers the first uplink transmission.

The priority associated with the data that triggers the first uplink transmission.

The priority of the resource grant associated with the first uplink transmission.

The priority configured by the first uplink transmission.

In an alternative embodiment, the second priority associated with the first SL transmission includes any one of the following priorities.

The priority associated with the logical channel associated with the data included in the first SL transmission.

The priority associated with the data included in the first SL transmission.

The priority associated with the logical channel associated with the data that triggers the first SL transmission.

The priority associated with the data that triggers the first SL transmission.

The priority of the resource grant associated with the first SL transmission.

The priority configured by the first SL transmission.

In an alternative embodiment, the third priority associated with the second uplink transmission includes any one of the following priorities.

The priority associated with the logical channel associated with the data included in the second uplink transmission.

The priority associated with the data included in the second uplink transmission.

The priority associated with the logical channel associated with the data that triggers the second uplink transmission.

The priority associated with the data that triggers the second uplink transmission.

The priority of the resource grant associated with the second uplink transmission.

The priority configured by the second uplink transmission.

According to an aspect of the disclosure, there is provided an apparatus for solving a transmission conflict, and the apparatus includes a transmission module.

The transmission module is configured to, when two transmissions experience a conflict, prioritize the transmission of one transmission among the two transmissions according to QoS attributes respectively associated with the two transmissions.

According to an aspect of the disclosure, there is provided a terminal, and the terminal includes: a processor; a transceiver connected to the processor; a memory configured for storing executable instructions of the processor. The processor is configured to load and execute the executable instructions to implement the transmission conflict resolution method described in the foregoing aspect.

According to an aspect of the disclosure, a computer-readable storage medium is provided, and executable instructions are stored in the readable storage medium. The executable instructions are loaded and executed by the processor to implement the transmission conflict resolution method described in the foregoing aspect.

The technical solutions provided by the embodiments of the disclosure include at least the following advantageous effects.

When two transmissions experience a conflict, the QoS attributes of the two transmissions are considered simultaneously, and the priority of transmission is determined according to the QoS attributes respectively associated with the two transmissions to thereby determining an object that is prioritized for transmission, which can effectively allocate network bandwidth and more reasonably use network resources.

BRIEF DESCRIPTION OF THE DRAWINGS

In order to more clearly describe the technical solutions in the embodiments of the disclosure, the description below will briefly introduce the drawings needed in the description of the embodiments. Clearly, the drawings in the following description are only some embodiments of the disclosure. For those of ordinary skill in the art, other drawings can be obtained based on these drawings without inventive effort.

FIG. 3 is a flowchart of a method for resolving a transmission conflict provided by an exemplary embodiment of the disclosure.

FIG. 4 is a schematic view of an apparatus for resolving a transmission conflict provided by an exemplary embodiment of the disclosure.

FIG. 5 is a schematic structural view of a communication device provided by an exemplary embodiment of the disclosure.

DESCRIPTION OF EMBODIMENTS

In order to make the purposes, technical solutions, and advantages of the disclosure clearer, the following further describes the disclosure in detail with reference to the accompanying drawings and embodiments.

First, a brief explanation for the terms involved in the embodiment of the disclosure is provided below.

V2X (Vehicle to everything): V2X is the key technology for future smart transportation system. V2X mainly involves studies of vehicle data transmission scheme based on the 3GPP communication protocol. V2X communication includes V2V (Vehicle to Vehicle) communication, V2I (Vehicle to Infrastructure) communication, and V2P (Vehicle to People) communication. V2X applications will improve driving safety, reduce congestion and vehicle energy consumption, and improve traffic efficiency.

Figure 1A:
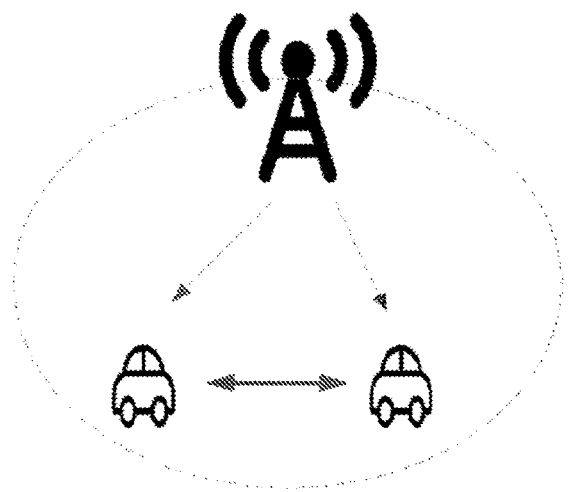
FIG. 1a and FIG. 1b are schematic views of the SL transmission mode in a related technology of the disclosure.
Figure 1B:
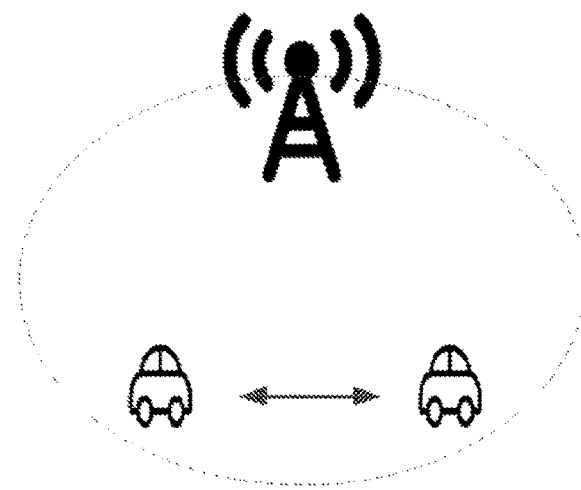

SL (SideLink) transmission: SL transmission is a device-to-device communication method with high spectrum efficiency and low transmission delay. Two SL transmission modes are defined in 3GPP: Mode A and Mode B. FIG. 1a and FIG. 1b are schematic views of the SL transmission mode in a related technology of the disclosure. As shown in FIG. 1a, in mode A, the transmission resources of the terminal are allocated by the base station through the downlink, and the terminal transmits data on SL according to the resources allocated by the base station. The base station can allocate resource for a single transmission for the terminal, and can also allocate resource for a semi-static transmission for the terminal. As shown in FIG. 1b, in mode B, the terminal selects a resource from the resource pool by itself for data transmission.

Figure 2:
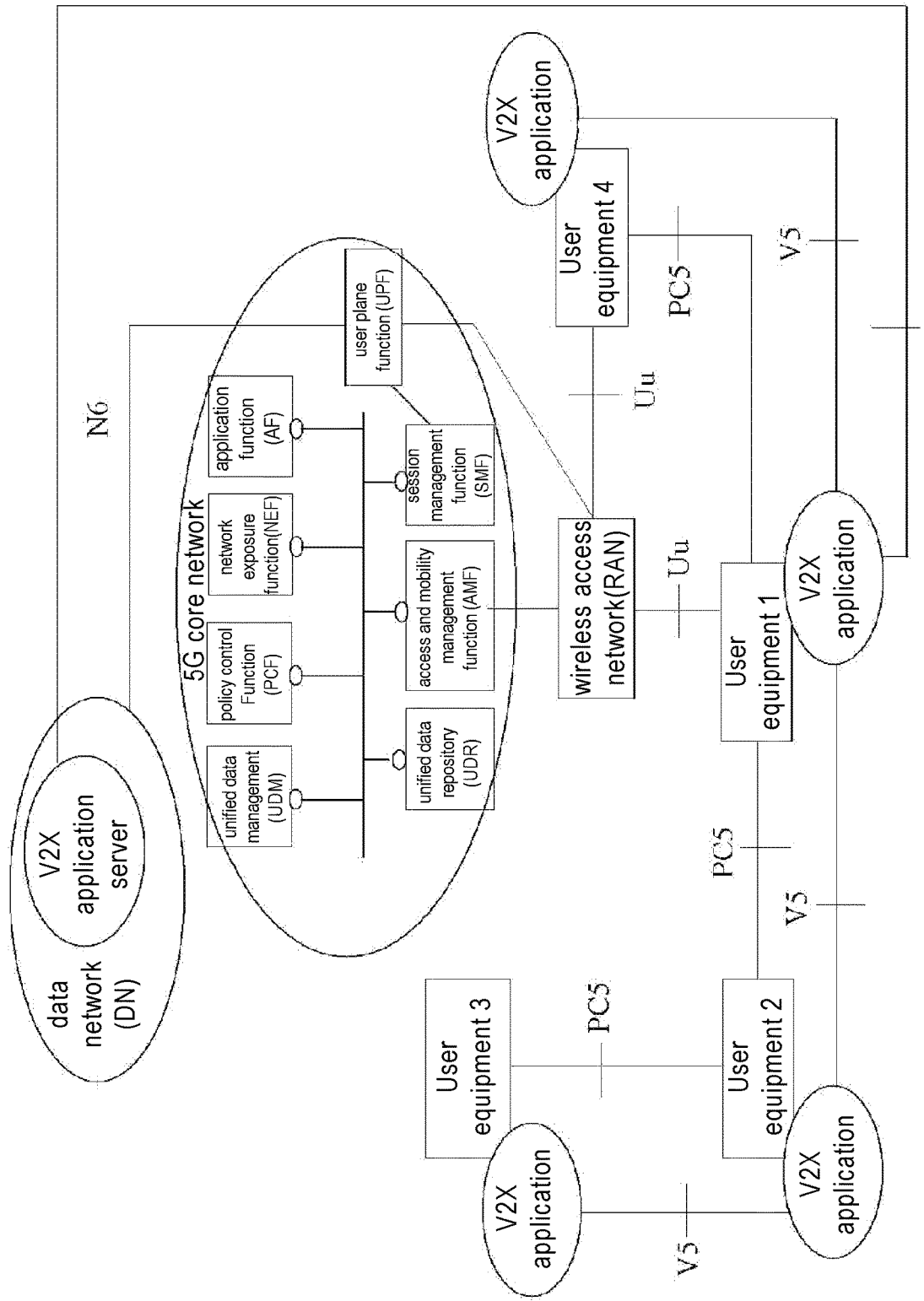
FIG. 2 is a block view of a communication system supporting uplink/SL transmission provided by an exemplary embodiment of the disclosure.

FIG. 2 is a block view of a communication system supporting uplink/SL transmission provided by an exemplary embodiment of the disclosure. The communication system may be a schematic view of a non-roaming 5G system architecture, which may be applied to a V2X service using D2D technology.

The system architecture includes a data network (DN), and a V2X application server required for V2X services is installed in the DN. The system architecture also includes a 5G core network. The network functions of the 5G core network include: unified data management (UDM), policy control function (PCF), network exposure function (NEF), application function (AF), unified data repository (UDR), access and mobility management function (AMF), session management function (SMF), and user plane function (UPF).

The system architecture further includes: a new generation-radio access network (NG-RAN) and four UEs (i.e., UE 1 to UE 4) shown as an example. Each of the UEs is provided with a V2X application. One or more access network devices, such as gNB, are set in the wireless access network. The UE performs uplink transmission to the access network device.

In this system architecture, the data network and the UPF in the 5G core network are connected through N6 reference point. The V2X application server is connected with the V2X application in the UE through V1 reference point. The wireless access network is connected with the AMF function and the UPF function in the 5G core network. The wireless access network is connected to the UE 1 and the UE 4 respectively through the Uu reference point. Multiple UEs perform SL transmission through the PC5 reference point, and multiple V2X applications are connected through the V5 reference point. The aforementioned reference points can also be referred to as "interfaces."

FIG. 3 is a flowchart of a method for resolving a transmission conflict provided by an exemplary embodiment of the disclosure. The method may be executed by the UE in V2X as shown in FIG. 2, and the method includes the following.

Step 301: When two transmissions experience a conflict, the transmission of one transmission among the two transmissions is prioritized according to QoS attributes respectively associated with the two transmissions.

Transmission refers to the process in which the UE in V2X sends data to other communication devices. Other communication devices include: at least one of other UEs and access network device.

Optionally, two transmission conflicts refer to: currently, the UE is to send data to two communication devices, that is, the two transmissions experience a conflict in time or transmission capability. The UE can only select one of the transmissions for prioritized transmission.

QoS attributes are a collection of a set of QoS requirements defined on the collective behavior of one or more objects.

The QoS attribute is a technology used to solve problems such as network delay and congestion. Based on the QoS mechanism, a network can use various basic technologies to provide better service capabilities for designated network communications.

Optionally, the QoS attributes correspond to QoS requirement parameters, which describe the speed and reliability of data transmission. The QoS requirement parameters include, but are not limited to: at least one of priority, throughput, transmission delay (abbreviation: time delay), and error rate.

Optionally, the "priority" in the disclosure generally refers to various explicit priorities or implicit priorities determined according to QoS attributes. The explicit priority includes the priority identifier clearly specified in the QoS attribute. The implicit priority includes: the priority determined according to the throughput, the priority determined according to the time delay, and the priority determined according to the error rate. For example, the priority with higher latency requirement is higher, and the priority with lower latency requirement is lower; the priority with higher error rate (packet loss rate) requirement is higher, and the priority with lower error rate requirement is lower.

Optionally, the communication device is a device that supports the QoS function.

Optionally, each uplink transmission or SL transmission has its own QoS attribute. For a certain type of data flow, it can be associated with a certain level of transmission priority to identify its relative importance. Moreover, the various priority-based forwarding strategies and congestion avoidance mechanisms provided by the communication device can be used to provide special transmission services for these data flows.

Optionally, when two transmissions experience a conflict, the transmission of one transmission among the two transmissions is prioritized according to at least one of the QoS attributes respectively associated with the two transmissions.

In summary of the above, in the method provided in this embodiment, when two transmissions experience a conflict, the priority of transmission is determined according to the QoS attributes respectively associated with both of the two transmissions, thereby determining an object that is prioritized for transmission, which may effectively allocate network bandwidth and more reasonably use network resources.

In an alternative embodiment based on FIG. 3, the two transmissions include: the first uplink transmission and the first SL transmission.

The first uplink transmission refers to the communication process in which the UE sends data to the access network device.

In an example, the first uplink transmission includes: transmission on a physical uplink control channel (PUCCH) carrying a first uplink scheduling request (SR); transmission on a physical uplink shared channel (PUSCH) carrying a first uplink buffer status report (BSR); and transmission on a PUSCH carrying a first medium access control service data unit (MAC SDU).

The first SL transmission refers to the communication process in which the UE sends data to other UEs.

In an example, the first SL transmission includes: transmission on a physical sidelink shared channel (PSSCH) carrying the second MAC SDU; and transmission on a physical sidelink feedback channel (PSFCH).

Optionally, the mode of the first SL transmission includes: at least one of mode A and mode B. In mode A, the transmission resources of UE are allocated by the access network device through the downlink, and the UE transmits data on the SL according to the resources allocated by the access network device. The access network device can allocate a resource for a single transmission for UE, and can also allocate resource for a semi-static transmission for the UE. In mode B, the UE selects a resource from the resource pool by itself for data transmission.

The conflict between the first uplink transmission and the first SL transmission is shown in Table 1.

TABLE 1

| First uplink transmission | First SL transmission |
|---|---|
| Transmission on PUCCH carrying the first uplink SR, where the SR is triggered by the SL logical channel | Transmission on PSSCH carrying the second MAC SDU; or, Transmission on PSFCH |
| Transmission on PUCCH carrying the first uplink SR, where the SR is triggered by the uplink logical channel | Transmission on PSSCH carrying the second MAC SDU; or, Transmission on PSFCH |
| Transmission on PUSCH carrying the first uplink BSR, where the BSR is triggered by the SL logical channel | Transmission on PSSCH carrying the second MAC SDU; or, Transmission on PSFCH |
| Transmission on PUSCH carrying the first uplink BSR, where the BSR is triggered by the uplink logical channel | Transmission on PSSCH carrying the second MAC SDU; or, Transmission on PSFCH |
| Transmission on PUSCH carrying the first MAC SDU | Transmission on PSSCH carrying the second MAC SDU; or, Transmission on PSFCH |

The operation of determining to prioritize the transmission of one transmission among the two transmissions according to QoS attributes respectively associated with the two transmissions involves the following six conditions.

1. If the first priority associated with the first uplink transmission is higher (or not lower than) the second priority associated with the first SL transmission, the transmission of first uplink transmission is prioritized.

The first priority associated with the first uplink transmission includes any one of the following priorities: the priority associated with the logical channel associated with the data included in the first uplink transmission; the priority associated with the data included in the first uplink transmission; the priority associated with the logical channel associated with the data that triggers the first uplink transmission; the priority associated with the data that triggers the first uplink transmission; the priority of the resource grant associated with the first uplink transmission; the priority configured by the first uplink transmission.

The second priority associated with the first SL transmission includes any one of the following priorities: the priority associated with the logical channel associated with the data included in the first SL transmission; the priority associated with the data included in the first SL transmission; the priority associated with the logical channel associated with the data that triggers the first SL transmission; the priority associated with the data that triggers the first SL transmission; the priority of the resource grant associated with the first SL transmission; the priority configured by the first SL transmission.

Schematically, the first uplink transmission is the transmission on the PUCCH carrying the first uplink SR, and the first priority associated with the first uplink transmission is the priority associated with the logical channel associated with the data that triggers the first uplink transmission. The first SL transmission is the transmission on PSFCH, and the second priority associated with the first SL transmission is the priority of resource grant associated with the first SL transmission.

The parameter value of the first priority associated with the first uplink transmission is 4, and the parameter value of the second priority associated with the first SL transmission is 5. The smaller the parameter value, the higher the priority, and the first priority associated with the first uplink transmission is higher than the second priority associated with the first SL transmission. The transmission of the first uplink transmission is prioritized, and the data including the first uplink SR on the PUCCH is transmitted.

2. If the first priority associated with the first uplink transmission is not higher (or lower than) the second priority associated with the first SL transmission, the transmission of the first SL transmission is prioritized.

Schematically, the first uplink transmission is the transmission on the PUCCH carrying the first uplink SR, and the first priority associated with the first uplink transmission is the priority associated with the logical channel associated with the data that triggers the first uplink transmission. The first SL transmission is the transmission on PSFCH, and the second priority associated with the first SL transmission is the priority of resource grant associated with the first SL transmission.

The parameter value of the first priority associated with the first uplink transmission is 4, and the parameter value of the second priority associated with the first SL transmission is 3. The smaller the parameter value, the higher the priority, and the first priority associated with the first uplink transmission is not higher than the second priority associated with the first SL transmission. The transmission of the first SL transmission is prioritized, and the data including PSFCH is transmitted.

3. If the first priority associated with the first uplink transmission is higher than (or not lower than) the first threshold, the transmission of the first uplink transmission is prioritized.

The first threshold is the threshold corresponding to prioritized transmission of the first uplink transmission. As long as the first priority of the first uplink transmission is higher than the first threshold, regardless of the priority of the first SL transmission at this time, the first uplink transmission is performed first.

Schematically, the first uplink transmission is the transmission on the PUSCH carrying the first uplink BSR, and the BSR is triggered by the SL logical channel or the uplink logical channel. The first priority associated with the first uplink transmission is the priority associated with the logical channel associated with the data that triggers the first uplink transmission.

The parameter value corresponding to the first threshold is 2. The parameter value corresponding to the first priority associated with the first uplink transmission is 1. The smaller the parameter value, the higher the priority, and the first priority associated with the first uplink transmission is higher than the first threshold. The transmission of the first uplink transmission is prioritized, and the data of PUSCH including the first uplink BSR is transmitted. In this manner, it is possible to avoid the situation that the first uplink BSR cannot be sent in time due to the conflict between uplink transmission and SL transmission. Or, it is possible to avoid the situation that the related PUSCH cannot be sent; or, it is possible to avoid the situation that the related PUSCH can be sent, but the related MAC SDU cannot be sent.

4. If the first priority associated with the first uplink transmission is not higher than (or lower than) the first threshold, the transmission of the first SL transmission is prioritized.

Schematically, the first uplink transmission is transmission on a PUSCH carrying the first uplink BSR, and the BSR is triggered by the SL logical channel or the uplink logical channel. The first priority associated with the first uplink transmission is the priority associated with the logical channel associated with the data that triggers the first uplink transmission.

The parameter value corresponding to the first threshold is 2. The parameter value corresponding to the first priority associated with the first uplink transmission is 3. The smaller the parameter value, the higher the priority, and the first priority associated with the first uplink transmission is not higher than the first threshold. The transmission of the first SL transmission is prioritized.

5. If the first priority associated with the first uplink transmission is not higher than (or lower than) the first threshold, and the second priority associated with the first SL transmission is higher than (or not lower than) the second threshold, the transmission of the first SL transmission is prioritized.

The second threshold is a threshold for prioritizing the transmission of the first SL transmission under the condition that the first priority associated with the first uplink transmission is not higher than the first threshold. Under the condition that the first priority associated with the first uplink transmission is not higher than the first threshold, as long as the second priority of the first SL transmission is higher than the second threshold, the relationship between the first uplink transmission and the first SL transmission is not considered, and the first SL transmission is performed first.

Schematically, the first uplink transmission is transmission on a PUCCH carrying the first uplink SR, and the SR is triggered by the SL logical channel or the uplink logical channel. The first priority associated with the first uplink transmission is the priority associated with the logical channel associated with the data that triggers the first uplink transmission. The parameter value corresponding to the second threshold is 2. The parameter value corresponding to the first priority associated with the first uplink transmission is 3. The smaller the parameter value, the higher the priority, and the first priority associated with the first uplink transmission is not higher than the second threshold.

The first SL transmission is the transmission on the PSFCH, and the second priority associated with the first SL transmission is the priority of resource grant associated with the first SL transmission. The parameter value corresponding to the third threshold is 4. The parameter value corresponding to the second priority associated with the first SL transmission is 3. The smaller the parameter value, the higher the priority, and the second priority associated with the first SL transmission is higher than the third threshold. The transmission of the first SL transmission is prioritized, and the data on the PSFCH is transmitted.

6. If the first priority associated with the first uplink transmission is not higher than (or lower than) the second threshold, and the second priority associated with the first SL transmission is not higher than (or lower than) the third threshold, the transmission of the first uplink transmission is prioritized.

Schematically, the first uplink transmission is transmission on a PUCCH carrying the first uplink SR, and the SR is triggered by the SL logical channel or the uplink logical channel. The first priority associated with the first uplink transmission is the priority associated with the logical channel associated with the data that triggers the first uplink transmission. The parameter value corresponding to the second threshold is 2. The parameter value corresponding to the first priority associated with the first uplink transmission is 3. The smaller the parameter value, the higher the priority, and the first priority associated with the first uplink transmission is not higher than the second threshold.

The first SL transmission is the transmission on the PSFCH, and the second priority associated with the first SL transmission is the priority of resource grant associated with the first SL transmission. The parameter value corresponding to the third threshold is 4. The parameter value corresponding to the second priority associated with the first SL transmission is 5. The smaller the parameter value, the higher the priority, and the second priority associated with the first SL transmission is not higher than the third threshold. The transmission of the first uplink transmission is prioritized, and the data including the first uplink SR on the PUCCH is transmitted. The first uplink SR can be triggered when the BSR cannot be included in time.

In summary of the above, in the method provided in this embodiment, when the uplink transmission and the SL transmission experience a conflict, including the condition where both the uplink transmission and the SL transmission are triggered by the SL, the transmission of one transmission is selected for priority transmission based on the QoS attributes associated with the two transmissions. By distinguishing between uplink transmission and SL transmission with different priorities, network resources can be used more reasonably.

In an alternative embodiment based on FIG. 3, the two transmissions include: a first uplink transmission and a second uplink transmission; the first uplink transmission includes an uplink data-related part, and the second uplink transmission includes a SL data-related part.

The first uplink transmission refers to a communication process in which the UE sends data related to the uplink data to the first access network device.

In an example, the first uplink transmission includes: the transmission on the PUCCH carrying the first uplink SR; the transmission on the PUSCH carrying the first uplink BSR; the transmission on the PUSCH carrying the first MAC SDU.

The second uplink transmission refers to a communication process in which the UE sends data related to SL data to the second access network device.

In an example, the second uplink transmission includes: the transmission on the PUCCH carrying the second uplink SR; the transmission on the PUSCH carrying the second uplink BSR; the transmission on the PUSCH carrying the third MAC SDU.

The conflict between the first uplink transmission and the second uplink transmission is shown in Table 2.

TABLE 2

| First uplink transmission | Second uplink transmission |
|---|---|
| Transmission on the PUSCH carrying the first uplink BSR, where the BSR is triggered by the uplink logical channel | Transmission on the PUCCH carrying the second uplink SR, where the SR is triggered by the SL logical channel |
| Transmission on the PUSCH carrying the first MAC SDU | Transmission on the PUCCH carrying the second uplink SR, where the SR is triggered by the SL logical channel |
| Transmission on the PUCCH carrying the first uplink SR, where the SR is triggered by the uplink logical channel | Transmission on the PUCCH carrying the second uplink SR, where the SR is triggered by the SL logical channel |
| Transmission on the PUCCH carrying the first uplink SR, where the SR is triggered by the uplink logical channel | Transmission on the PUSCH carrying the second uplink BSR, where the BSR is triggered by the SL logical channel |
| Transmission on the PUSCH carrying the first uplink BSR, where the BSR is triggered by the uplink logical channel | Transmission on the PUSCH carrying the second uplink BSR, where the BSR is triggered by the SL logical channel |
| Transmission on the PUSCH carrying the first MAC SDU | Transmission on the PUSCH carrying the second uplink BSR, where the BSR is triggered by the SL logical channel |

The operation of determining to prioritize the transmission of one transmission among the two transmissions according to QoS attributes respectively associated with the two transmissions involves the following eight conditions.

1. If the first priority associated with the first uplink transmission is higher (or not lower than) the third priority associated with the second uplink transmission, the transmission of the first uplink transmission is prioritized.

The first priority associated with the first uplink transmission includes any one of the following priorities: the priority associated with the logical channel associated with the data included in the first uplink transmission; the priority associated with the data included in the first uplink transmission; the priority associated with the logical channel associated with the data that triggers the first uplink transmission; the priority associated with the data that triggers the first uplink transmission; the priority of the resource grant associated with the first uplink transmission; the priority configured by the first uplink transmission.

The third priority associated with the second uplink transmission includes any one of the following priorities: the priority associated with the logical channel associated with the data included in the second uplink transmission; the priority associated with the data included in the second uplink transmission; the priority associated with the logical channel associated with the data that triggers the second uplink transmission; the priority associated with the data that triggers the second uplink transmission; the priority of the resource grant associated with the second uplink transmission; the priority configured by the second uplink transmission.

Schematically, the first uplink transmission is transmission on a PUCCH carrying the first uplink SR, and the SR is triggered by the SL logical channel or the uplink logical channel. The first priority associated with the first uplink transmission is the priority associated with the logical channel associated with the data that triggers the first uplink transmission. The second uplink transmission is the transmission on the PUSCH carrying the second uplink BSR, and the BSR is triggered by the SL logical channel or the uplink logical channel. The third priority associated with the second uplink transmission is the priority associated with the logical channel associated with the data that triggers the second uplink transmission.

The parameter value of the first priority associated with the first uplink transmission is 4, and the parameter value of the third priority associated with the second uplink transmission is 5. The smaller the parameter value, the higher the priority, and the first priority associated with the first uplink transmission is higher than the third priority associated with the second uplink transmission. The transmission of the first uplink transmission is prioritized, and the data including the first uplink SR on the PUCCH is transmitted. The first uplink SR can be triggered when the BSR cannot be included in time.

2. If the first priority associated with the first uplink transmission is not higher than (or lower than) the third priority associated with the second uplink transmission, the transmission of the second uplink transmission is prioritized.

Schematically, the first uplink transmission is transmission on a PUCCH carrying the first uplink SR, and the SR is triggered by the SL logical channel or the uplink logical channel. The first priority associated with the first uplink transmission is the priority associated with the logical channel associated with the data that triggers the first uplink transmission. The second uplink transmission is the transmission on the PUSCH carrying the second uplink BSR, and the BSR is triggered by the SL logical channel or the uplink logical channel. The third priority associated with the second uplink transmission is the priority associated with the logical channel associated with the data that triggers the second uplink transmission.

The parameter value of the first priority associated with the first uplink transmission is 4, and the parameter value of the third priority associated with the second uplink transmission is 3. The smaller the parameter value, the higher the priority, and the first priority associated with the first uplink transmission is not higher than the third priority associated with the second uplink transmission. The transmission of the second uplink transmission is prioritized, and the data of PUSCH including the second uplink BSR is transmitted. In this manner, it is possible to avoid the situation that the second uplink BSR cannot be sent in time due to the conflict between two uplink transmissions. Or, it is possible to avoid the situation that the related PUSCH cannot be sent; or, it is possible to avoid the situation that the related PUSCH can be sent, but the related MAC SDU cannot be sent.

3. If the third priority associated with the second uplink transmission is higher than (or not lower than) the third threshold, the transmission of the second uplink transmission is prioritized.

The third threshold is the threshold corresponding to prioritized transmission of the second uplink transmission. As long as the third priority associated with the second uplink transmission is higher than the third threshold, regardless of the priority of the first uplink transmission at this time, the second uplink transmission is performed first.

Schematically, the second uplink transmission is transmission on a PUCCH carrying a second uplink SR, and the SR is triggered by the SL logical channel or the uplink logical channel. The third priority associated with the second uplink transmission is the priority associated with the logical channel associated with the data that triggers the second uplink transmission.

The parameter value corresponding to the third threshold is 2. The parameter value corresponding to the third priority associated with the second uplink transmission is 1. The smaller the parameter value, the higher the priority, and the third priority associated with the second uplink transmission is higher than the third threshold. The transmission of the second uplink transmission is prioritized, and the data including the second uplink SR on the PUCCH is transmitted. The second uplink SR can be triggered when the BSR cannot be included in time.

4. If the third priority associated with the second uplink transmission is not higher than the fourth threshold, the transmission of the first uplink transmission is prioritized.

Schematically, the second uplink transmission is transmission on a PUCCH carrying a second uplink SR, and the SR is triggered by the SL logical channel or the uplink logical channel. The third priority associated with the second uplink transmission is the priority associated with the logical channel associated with the data that triggers the second uplink transmission.

The parameter value corresponding to the fourth threshold is 2. The parameter value corresponding to the third priority associated with the second uplink transmission is 3. The smaller the parameter value, the higher the priority, and the third priority associated with the second uplink transmission is not higher than the fourth threshold. The transmission of the first uplink transmission is prioritized.

5. If the first priority associated with the first uplink transmission is higher than (or not lower than) the fourth threshold, the transmission of the first uplink transmission is prioritized.

The fourth threshold is the threshold corresponding to prioritized transmission of the first uplink transmission. As long as the first priority associated with the first uplink transmission is higher than the fourth threshold, regardless of the priority of the second uplink transmission at this time, the first uplink transmission is performed first.

Schematically, the first uplink transmission is transmission on a PUSCH carrying a first uplink SR, and the BSR is triggered by the SL logical channel or the uplink logical channel. The first priority associated with the first uplink transmission is the priority associated with the logical channel associated with the data that triggers the first uplink transmission.

The parameter value corresponding to the fourth threshold is 2. The parameter value corresponding to the first priority associated with the first uplink transmission is 1. The smaller the parameter value, the higher the priority, and the first priority associated with the first uplink transmission is higher than the fourth threshold. The transmission of the first uplink transmission is prioritized, and the data of PUSCH including the first uplink BSR is transmitted. In this manner, it is possible to avoid the situation that the first uplink BSR cannot be sent in time due to the conflict between two uplink transmissions. Or, it is possible to avoid the situation that the related PUSCH cannot be sent; or, it is possible to avoid the situation that the related PUSCH can be sent, but the related MAC SDU cannot be sent.

6. If the first priority associated with the first uplink transmission is not higher than (or lower than) the fourth threshold, the transmission of the second uplink transmission is prioritized.

Schematically, the first uplink transmission is transmission on a PUSCH carrying a first uplink BSR, and the BSR is triggered by the SL logical channel or the uplink logical channel. The first priority associated with the first uplink transmission is the priority associated with the logical channel associated with the data that triggers the first uplink transmission.

The parameter value corresponding to the fourth threshold is 2. The parameter value corresponding to the first priority associated with the first uplink transmission is 3. The smaller the parameter value, the higher the priority, and the first priority associated with the first uplink transmission is not higher than the fifth threshold. The transmission of the second uplink transmission is prioritized.

7. If the first priority associated with the first uplink transmission is not higher than (or lower than) the fourth threshold, and the third priority associated with the second uplink transmission is higher than (or not lower than) the fifth threshold, the transmission of the second uplink transmission is prioritized.

The fifth threshold is a threshold for prioritizing the transmission of the second uplink transmission under the condition that the first priority associated with the first uplink transmission is not higher than the fourth threshold. Under the condition that the first priority associated with the first uplink transmission is not higher than the fourth threshold, as long as the third priority of the second uplink transmission is higher than the fifth threshold, the relationship between the first uplink transmission and the second uplink transmission is not considered, and the second uplink transmission is performed first.

Schematically, the first uplink transmission is transmission on a PUSCH carrying the first uplink BSR, and the BSR is triggered by the SL logical channel or the uplink logical channel. The first priority associated with the first uplink transmission is the priority associated with the logical channel associated with the data that triggers the first uplink transmission. The parameter value corresponding to the fourth threshold is 2. The parameter value corresponding to the first priority associated with the first uplink transmission is 3. The smaller the parameter value, the higher the priority, and the first priority associated with the first uplink transmission is not higher than the fourth threshold.

The second uplink transmission is the transmission on the PUCCH carrying the second uplink SR, and the SR is triggered by the SL logical channel or the uplink logical channel. The second priority associated with the second uplink transmission is the priority associated with the logical channel associated with the data that triggers the second uplink transmission. The parameter value corresponding to the fifth threshold is 4. The parameter value corresponding to the third priority associated with the second uplink transmission is 3. The smaller the parameter value, the higher the priority, and the third priority associated with the second uplink transmission is higher than the fifth threshold. The transmission of the second uplink transmission is prioritized, and the data including the second uplink SR on the PUCCH is transmitted. The second uplink SR can be triggered when the BSR cannot be included in time.

8. If the first priority associated with the first uplink transmission is not higher than (or lower than) the fourth threshold, and the third priority associated with the second uplink transmission is not higher than (or lower than) the fifth threshold, the transmission of the first uplink transmission is prioritized.

Schematically, the first uplink transmission is transmission on a PUSCH carrying the first uplink BSR, and the BSR is triggered by the SL logical channel or the uplink logical channel. The first priority associated with the first uplink transmission is the priority associated with the logical channel associated with the data that triggers the first uplink transmission. The parameter value corresponding to the fourth threshold is 2. The parameter value corresponding to the first priority associated with the first uplink transmission is 3. The smaller the parameter value, the higher the priority, and the first priority associated with the first uplink transmission is not higher than the fourth threshold.

The second uplink transmission is the transmission on the PUCCH carrying the second uplink SR, and the SR is triggered by the SL logical channel or the uplink logical channel. The second priority associated with the second uplink transmission is the priority associated with the logical channel associated with the data that triggers the second uplink transmission. The parameter value corresponding to the fifth threshold is 4. The parameter value corresponding to the third priority associated with the second uplink transmission is 5. The smaller the parameter value, the higher the priority, and the third priority associated with the second uplink transmission is not higher than the fifth threshold. The transmission of the first uplink transmission is prioritized, and the data of PUSCH including the first uplink BSR is transmitted. In this manner, it is possible to avoid the situation that the first uplink BSR cannot be sent in time due to the conflict between two uplink transmissions. Or, it is possible to avoid the situation that the related PUSCH cannot be sent; or, it is possible to avoid the situation that the related PUSCH can be sent, but the related MAC SDU cannot be sent.

In summary of the above, in the method provided in this embodiment, when two uplink transmissions and the SL transmission experience a conflict, including the first uplink transmission triggered by the uplink data to be transmitted and the second uplink transmission triggered by the SL data to be transmitted. The transmission of one transmission is selected for priority transmission based on the QoS attributes associated with the two transmissions, so that network resources can be used more reasonably.

FIG. 4 is a schematic view of an apparatus for resolving a transmission conflict provided by an exemplary embodiment of the disclosure, and the apparatus includes a transmission module.

The transmission module 401 is configured to prioritize the transmission of one transmission among two transmissions according to the QoS attributes respectively associated with the two transmissions when two transmissions experience a conflict.

In an example, the two transmissions include: the first uplink transmission and the first SL transmission.

The transmission module 401 is configured to prioritize the transmission of the first uplink transmission if the first priority associated with the first uplink transmission is higher than the second priority associated with the first SL transmission.

Or, the transmission module 401 is configured to prioritize the transmission of the first SL transmission if the first priority associated with the first uplink transmission is not higher than the second priority associated with the first SL transmission.

Or, the transmission module 401 is configured to prioritize the transmission of the first uplink transmission if the first priority associated with the first uplink transmission is higher than the first threshold.

Or, the transmission module 401 is configured to prioritize the transmission of the first SL transmission if the first priority associated with the first uplink transmission is not higher than the first threshold.

Or, the transmission module 401 is configured to prioritize the transmission of the first SL transmission if the first priority associated with the first uplink transmission is not higher than the first threshold and the second priority associated with the first SL transmission is higher than the second threshold.

Or, the transmission module 401 is configured to prioritize the transmission of the first uplink transmission if the first priority associated with the first uplink transmission is not higher than the first threshold, and the second priority associated with the first SL transmission is not higher than the second threshold.

In an example, the two transmissions include: a first uplink transmission and a second uplink transmission; the first uplink transmission includes an uplink data-related part, and the second uplink transmission includes a SL data-related part.

The transmission module 401 is configured to prioritize the transmission of the first uplink transmission if the first priority associated with the first uplink transmission is higher than the third priority associated with the second uplink transmission.

Or, the transmission module 401 is configured to prioritize the transmission of the second uplink transmission if the first priority associated with the first uplink transmission is not higher than the third priority associated with the second uplink transmission.

Or, the transmission module 401 is configured to prioritize the transmission of the second uplink transmission if the third priority associated with the second uplink transmission is higher than the third threshold.

Or, the transmission module 401 is configured to prioritize the transmission of the first uplink transmission if the third priority associated with the second uplink transmission is not higher than the third threshold.

Or, the transmission module 401 is configured to prioritize the transmission of the first uplink transmission if the first priority associated with the first uplink transmission is higher than the fourth threshold.

Or, the transmission module 401 is configured to prioritize the transmission of the second uplink transmission if the first priority associated with the first uplink transmission is not higher than the fourth threshold.

Or, the transmission module 401 is configured to prioritize the transmission of the second uplink transmission if the first priority associated with the first uplink transmission is not higher than the fourth threshold, and the third priority associated with the second uplink transmission is higher than the fifth threshold.

Or, the transmission module 401 is configured to prioritize the transmission of the first uplink transmission if the first priority associated with the first uplink transmission is not higher than the fourth threshold, and the third priority associated with the second uplink transmission is not higher than the fifth threshold.

In an example, the first priority associated with the first uplink transmission includes any one of the following priorities: the priority associated with the logical channel associated with the data contained in the first uplink transmission; the priority associated with the data included in the first uplink transmission; the priority associated with the logical channel associated with the data that triggers the first uplink transmission; the priority associated with the data that triggers the first uplink transmission; the priority of the resource grant associated with the first uplink transmission; the priority configured by the first uplink transmission.

In an example, the second priority associated with the first SL transmission includes any one of the following priorities: the priority associated with the logical channel associated with the data contained in the first SL transmission; the priority associated with the data included in the first SL transmission; the priority associated with the logical channel associated with the data that triggers the first SL transmission; the priority associated with the data that triggers the first SL transmission; the priority of resource grant associated with the first SL transmission; the priority configured by the first SL transmission.

In an example, the third priority associated with the second uplink transmission includes any one of the following priorities: the priority associated with the logical channel associated with the data contained in the second uplink transmission; the priority associated with the data included in the second uplink transmission; the priority associated with the logical channel associated with the data that triggers the second uplink transmission; the priority associated with the data that triggers the second uplink transmission; the priority of resource grant associated with the second uplink transmission; the priority configured by the second uplink transmission.

In an example, the first uplink transmission includes: the transmission on the PUCCH carrying the first uplink SR; the transmission on the PUSCH carrying the first uplink BSR; the transmission on the PUSCH carrying the first MAC SDU.

In an example, the first SL transmission includes: transmission on the PSSCH carrying the second MAC SDU; transmission on the PSFCH.

In an example, the second uplink transmission includes: the transmission on the PUCCH carrying the second uplink SR; the transmission on the PUSCH carrying the second uplink BSR; the transmission on PUSCH carrying the third MAC SDU.

FIG. 5 is a schematic structural view of a communication device (terminal or access network device) provided by an exemplary embodiment of the disclosure. The communication device includes: a processor 101, a receiver 102, a transmitter 103, a memory 104, and a bus 105.

The processor 101 includes one or more processing cores, and the processor 101 executes various functional applications and information processing by running software programs and modules.

The receiver 102 and the transmitter 103 may be implemented as a communication element, and the communication element may be a communication chip.

The memory 104 is connected to the processor 101 through the bus 105.

The memory 104 may be configured to store at least one instruction, and the processor 101 is configured to execute the at least one instruction to implement various steps in the foregoing method embodiment.

In addition, the memory 104 can be implemented by any type of volatile or non-volatile storage apparatus or a combination thereof. The volatile or non-volatile storage apparatus includes, but is not limited to: floppy disks or optical discs, EEPROM (electrically erasable programmable read-only memory), EPROM (erasable programmable read-only memory), SRAM (static random access memory), ROM (read-only memory), magnetic memory, flash memory, and PROM (programmable read-only memory).

In an exemplary embodiment, a computer-readable storage medium is also provided. The computer-readable storage medium stores at least one instruction, at least one program, a code set, or an instruction set. The at least one instruction, the at least one program, the code set, or the instruction set is loaded and executed by the processor to implement the transmission conflict resolution method performed by the communication device provided by the foregoing method embodiments.

Those of ordinary skill in the art can understand that all or part of the steps in the above embodiments can be implemented by hardware, or by instruction-related hardware through a program. The program can be stored in a computer-readable storage medium. The storage medium mentioned above can be a read-only memory, a floppy disk or an optical disc, etc.

The above are only optional embodiments of the disclosure and are not used to limit the disclosure. Any modification, equivalent replacement, improvement, etc. made within the spirit and principles of the disclosure shall fall within the scope to be protected by the disclosure.

What is claimed is:

1. A method for resolving a transmission conflict, comprising:
prioritizing, when two transmissions experience a conflict, a transmission of one transmission among the two transmissions according to quality of service (QoS) attributes respectively associated with the two transmissions, wherein the two transmissions comprise a first uplink transmission and a second uplink transmission in which the first uplink transmission comprises an uplink data-related part and the second uplink transmission comprises a SL data-related part,
prioritizing the transmission of the one transmission among the two transmissions according to the QoS attributes respectively associated with the two transmissions comprises:
if a first priority associated with the first uplink transmission is not higher than a threshold, and a third priority associated with the second uplink transmission is higher than another threshold, prioritizing the transmission of the second uplink transmission, wherein the third priority associated with the second uplink transmission comprises: a priority associated with a logical channel associated with data that triggers the second uplink transmission.

2. The method according to claim 1, wherein the first priority associated with the first uplink transmission comprises any one of the following priorities:
a priority associated with a logical channel associated with data comprised in the first uplink transmission;
a priority associated with the logical channel associated with data that triggers the first uplink transmission.

3. The method according to claim 1, wherein the first uplink transmission comprises any one of:
a transmission on a physical uplink control channel (PUCCH) carrying a first uplink scheduling request (SR);
a transmission on a physical uplink shared channel (PUSCH) carrying a first uplink buffer status report (BSR);
a transmission on the PUSCH carrying a first medium access control service data unit (MAC SDU).

4. The method according to claim 1, wherein the second uplink transmission comprises any one of:
a transmission on a physical uplink control channel (PUCCH) carrying a second uplink scheduling request (SR);
a transmission on a physical uplink shared channel (PUSCH) carrying a second uplink buffer status report (BSR);
a transmission on the PUSCH carrying a third medium access control service data unit (MAC SDU).

5. An apparatus for resolving a transmission conflict, wherein the apparatus comprises:
a transmitter; and
a processor, coupled to the transmitter, and configured to prioritize, through the transmitter when two transmissions experience a conflict, a transmission of one transmission among the two transmissions according to quality of service (QOS) attributes respectively associated with the two transmissions, wherein the two transmissions comprise a first uplink transmission and a second uplink transmission in which the first uplink transmission comprises an uplink data-related part and the second uplink transmission comprises a SI data-related part
the processor is configured to prioritize, through the transmitter, the transmission of the second uplink transmission if a first priority associated with the first uplink transmission is not higher than a threshold, and a third priority associated with the second uplink transmission is higher than another threshold, wherein the third priority associated with the second uplink transmission comprises: a priority associated with a logical channel associated with data that triggers the second uplink transmission.

6. The apparatus according to claim 5, wherein the first priority associated with the first uplink transmission comprises any one of the following priorities:
- a priority associated with a logical channel associated with data contained in the first uplink transmission;
- a priority associated with the logical channel associated with data that triggers the first uplink transmission.

7. The apparatus according to claim 5, wherein the first uplink transmission comprises any one of:
- a transmission on a physical uplink control channel (PUCCH) carrying a first uplink scheduling request (SR);
- a transmission on a physical uplink shared channel (PUSCH) carrying a first uplink buffer status report (BSR);
- a transmission on the PUSCH carrying a first medium access control service data unit (MAC SDU).

8. The apparatus according to claim 5, wherein the second uplink transmission comprises any one of:
- a transmission on a physical uplink control channel (PUCCH) carrying a second uplink scheduling request (SR);
- a transmission on a physical uplink control channel (PUSCH) carrying a second uplink buffer status report (BSR);
- a transmission on the PUSCH carrying a third medium access control service data unit (MAC SDU).

9. A non-transitory computer-readable storage medium, wherein executable instructions are stored in the computer-readable storage medium, and the executable instructions are loaded and executed by a processor to perform:
- prioritizing, when two transmissions experience a conflict, a transmission of one transmission among the two transmissions according to quality of service (QoS) attributes respectively associated with the two transmissions, wherein the two transmissions comprise a first uplink transmission and a second uplink transmission in which the first uplink transmission comprises an uplink data-related part and the second uplink transmission comprises a SL data-related part,
- prioritizing the transmission of the one transmission among the two transmissions according to the QoS attributes respectively associated with the two transmissions comprises:
  - if a first priority associated with the first uplink transmission is not higher than a threshold, and a third priority associated with the second uplink transmission is higher than another threshold, prioritizing the transmission of the second uplink transmission, wherein the third priority associated with the second uplink transmission comprises: a priority associated with a logical channel associated with data that triggers the second uplink transmission.

10. The non-transitory computer-readable storage medium according to claim 9, wherein the first priority associated with the first uplink transmission comprises any one of the following priorities:
- a priority associated with a logical channel associated with data comprised in the first uplink transmission;
- a priority associated with the logical channel associated with data that triggers the first uplink transmission.

11. The non-transitory computer-readable storage medium according to claim 9, wherein the first uplink transmission comprises any one of:
- a transmission on a physical uplink control channel (PUCCH) carrying a first uplink scheduling request (SR);
- a transmission on a physical uplink shared channel (PUSCH) carrying a first uplink buffer status report (BSR);
- a transmission on the PUSCH carrying a first medium access control service data unit (MAC SDU).

12. The non-transitory computer-readable storage medium according to claim 9, wherein the second uplink transmission comprises any one of:
- a transmission on a physical uplink control channel (PUCCH) carrying a second uplink scheduling request (SR);
- a transmission on a physical uplink shared channel (PUSCH) carrying a second uplink buffer status report (BSR);
- a transmission on the PUSCH carrying a third medium access control service data unit (MAC SDU).

* * * * *